United States Patent [19]

Oda et al.

[11] Patent Number: 4,652,356
[45] Date of Patent: Mar. 24, 1987

[54] ION EXCHANGE MEMBRANE AND ELECTROLYTIC CELL USING THEREOF

[75] Inventors: Yoshio Oda; Takeshi Morimoto; Kohji Suzuki, all of Yokohama, Japan

[73] Assignee: Asahi Glass Company, Ltd., Tokyo, Japan

[21] Appl. No.: 355,312

[22] Filed: Mar. 5, 1982

Related U.S. Application Data

[63] Continuation-in-part of Ser. No. 205,567, Nov. 10, 1980.

[30] Foreign Application Priority Data

Mar. 20, 1981 [JP] Japan ................................. 56-39620
Jun. 12, 1982 [JP] Japan ................................. 56-74165

[51] Int. Cl.$^4$ ............................................. C25B 11/03
[52] U.S. Cl. .................................. 204/283; 204/296; 204/98; 204/128; 204/129

[58] Field of Search ................. 204/98, 128, 129, 283, 204/296

[56] References Cited

U.S. PATENT DOCUMENTS

| | | | |
|---|---|---|---|
| 3,134,697 | 5/1964 | Niedrach | 136/86 |
| 3,262,868 | 7/1966 | Juda | 204/98 |
| 4,135,996 | 1/1979 | Bouy et al. | 204/252 |
| 4,177,116 | 12/1979 | De Nora et al. | 204/98 |
| 4,250,013 | 2/1981 | Carlin | 204/282 |
| 4,340,452 | 7/1982 | De Nora | 204/98 |

Primary Examiner—R. L. Andrews
Attorney, Agent, or Firm—Oblon, Fisher, Spivak, McClelland & Maier

[57] ABSTRACT

A cation exchange membrane comprising a gas and liquid permeable porous non-electrode layer on at least one surface of said membrane and an electrolytic cell using thereof, wherein said porous layer is formed by many conductive or non-conductive particles or particle groups which are partially or wholly discontinuously bonded on said membrane.

16 Claims, 7 Drawing Figures

ION EXCHANGE MEMBRANE AND ELECTROLYTIC CELL USING THEREOF

CROSS-REFERENCE TO RELATED APPLICATIONS

This application is a continuation-in-part of application Ser. No. 205,567, filed Nov. 10, 1980 pending.

BACKGROUND OF THE INVENTION

1. Field of the Invention

The present invention relates to a cation exchange membrane and an electrolytic cell using thereof. More particularly, it relates to a cation exchange membrane and an electrolytic cell using thereof suitable for an electrolysis of water or an aqueous solution of an acid, a base, an alkali metal halide or an alkali metal carbonate.

2. Description of the Prior Art

As a process for producing an alkali metal hydroxide and chlorine by an electrolysis of an aqueous solution of an alkali metal chloride, a diaphragm method has been mainly employed instead of a mercury method in view of a prevention of a public pollution. Moreover, an ion exchange membrane method has been practically operated to produce an alkali metal hydroxide having high concentration in high purity On the other hand, in view of energy saving, it has required to minimize a cell voltage in such electrolysis. Various processes have been proposed, however, the purpose has not been satisfactorily attained since the effect for reduction of the cell voltage has not been satisfactory or the cell has been complicated.

The inventors have studied to operate an electrolysis of an aqueous solution at a minimized load voltage and have found that the purpose has been satisfactorily attained by using a cation exchange membrane having a gas and liquid permeable porous non-electrode layer on at least one of surfaces of the cation exchange membrane facing to an anode or a cathode which is proposed in European Patent Publication No. 0029751 or U.S. Ser. No. 205,567.

The effect for reducing a cell voltage by the use of the cation exchange membrane having such porous layer on the surface is depending upon a kind of the material, a porosity and a thickness of the porous layer. Thus, it is surprising phenomenon that the effect for reducing a cell voltage is attained even by the use of the porous layer made of a non-conductive material. The effect for reducing a cell voltage is also attained even though electrodes are placed with a gap from the membrane without contacting the electrode to the membrane, although the extent of the effect is not remarkable.

SUMMARY OF THE INVENTION

It is an object of the present invention to reduce a cell voltage without deterioration of caracteristics of an electrolysis. It is another object of the present invention to reduce a content of particles used for a gas and liquid permeable porous non-electrode layer bonded on at least one surface of a cation exchange membrane.

The foregoing and other objects of the present invention have been attained by providing a cation exchange membrane for electrolysis which comprises a gas and liquid permeable porous non-electrode layer on at least one surface of said membrane wherein said porous layer is formed by many conductive or non-conductive particles or particle groups which are partially or wholly discontinuously bonded on said membrane.

DETAILED DESCRIPTION OF THE PREFERRED EMBODIMENTS

The effect for reducing a content of particles for the gas and liquid permeable porous non-electrode layer is remarkably advantageous. It is economically advantageous in the case of expensive particles and it is easy to form the porous layer on the membrane. Moreover, the characteristics of the resulting membrane are not inferior to those of a membrane having a thick porous layer formed with a lot of particles. Sometimes, the resulting membrane results in superior current efficiency to be noticeably advantageous in a practical operation.

Figure 1:
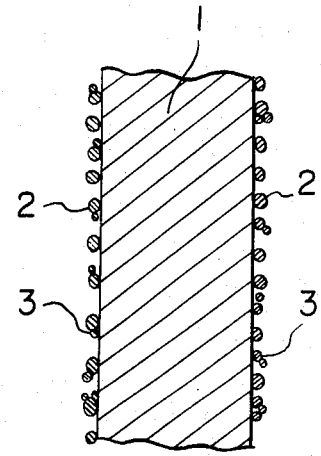
FIG. 1 is a partially sectional view of one embodiment of a cation exchange membrane of the present invention.
Figure 2:
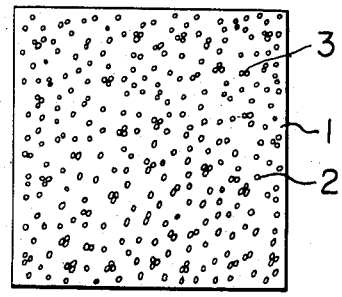
FIG. 2 is a plane view of one embodiment of the cation exchange membrane.

FIG. 1 is a partially sectional view of one embodiment of a cation exchange membrane of the present invention wherein the membrane (1) has each porous layer on both surfaces of the membrane. As it is shown in FIG. 1, the porous layer is formed by many particles (2) or particle groups (3) which are particle masses formed by aggregation of the particles. The particles (2) or the particle groups (3) are separately or discontinuously bonded on the membrane respectively. Thus, there are parts of the surface of the membrane on which any particle or particle group is not bonded. This condition is understood in FIG. 2 as the plane view of one embodiment of an ion exchange membrane.

An amount of the particles or the particle groups which are bonded on the surface of the membrane to form the porous layer is depending upon a kind and a size of the particles. According to the studies, it is found that the numer of the particles is preferably in a range of $5$–$10^{12}$/cm$^2$ especially $10$–$2\times10^{11}$/cm$^2$.

In the present invention, the particles or the particle groups can be partially or wholly discontinuously bonded in a form of a continuous pattern. Preferably, the ratio of the parts of the surface of the membrance on which any particle or particle group is bonded to the whole surface of the membrane is in the range of 5–90%, especially 10–80%. Further the dimension of such parts is preferably in the range of 100$\mu$–5 mm, especially 100$\mu$–3 mm.

Figure 4:
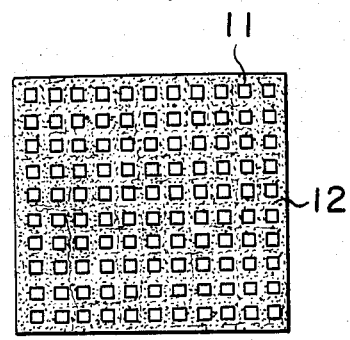
FIGS. 4 to 7 are plane view of each membrane having each pattern of particles or particle groups of the present invention.
Figure 5:
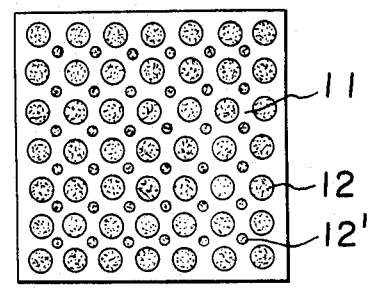
Figure 6:
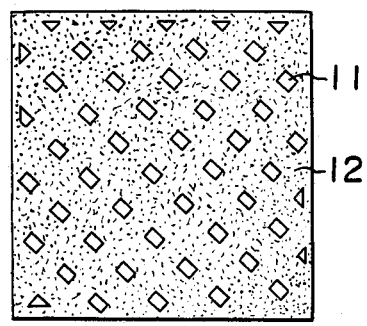
Figure 7:
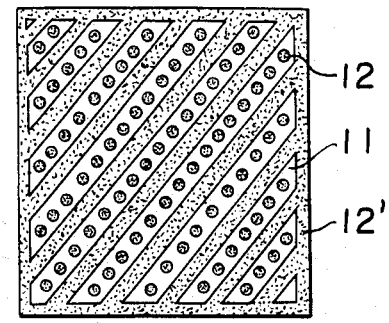

In the present invention, in view of the plane view of the particles of the porous layer, the continuous pattern as a whole view, is formed. As shown in FIGS. 4 to 6, the discontinuous porous layer (12) can be formed in the continuous pattern on the membrane (11). As shown in FIG. 5, the porous layers 12, 12' can be formed in the discontinuous pattern, but it is a continuous pattern as a whole. As shown in FIG. 7, the porous layers can be in a form of combination of a discontinuous pattern 12 and a continuous pattern 12' on the membrane (11). An amount of the particles or the particle groups bonded is perferably in a range of 0.001–5 mg/cm², especially 0.005–2.0 mg/cm² based on the unit area of the surface of the membrane. When the amount of the particles or the particle groups is too small, the desired effect is not attained whereas when it is too much, the effect for reducing the amount of the particles is disadvantageously less.

The particles for the gas and liquid permeable porous layer formed on the cation exchange membrane can be conductive or non-conductive and can be made of an inorganic or organic material as far as the particles do not impart an electrode function. It is preferable to be made of a material having high corrosion resistance to an electrolyte an evolved gas at electrode, such as metals, oxides, hydroxides, carbides, nitrides of metals and mixtures thereof, and corrosion resistance polymers especially fluorinated polymers.

In the case of an electrolysis of an aqueous solution of an alkali metal chloride, the porous layer in the anode side can be made of a powder selected from the group consisting of metals in IV-A Group (preferably Ge, Sn, Pb); metals in IV-B Group (preferably Ti, Zr, Hf); metals in V-B Group (preferably Nb, Ta); metals in iron Group (Fe, Co, Ni) or alloys, oxides, hydroxides, nitrides and carbides thereof.

On the other hand, the porous layer in the cathode side can be a powder used for the porous layer in the anode side and also silver, stainless steel and carbon (active carbon, graphite etc.).

In the formation of the porous layer, the material is preferably used in a form of a powder having a particle diameter of 0.01–300μ especially 0.1–100μ. In the formation, if necessary, it is possible to use a binder of a fluorocarbon polymer such as polytetrafluoroethylene, and polyhexafluoropropylene; or a thickener of a cellulose derivative such as carboxymethyl cellulose, methyl cellulose and hydroxyethyl cellulose; or a water soluble thickener such as polyethyleneglycol, polyvinyl alcohol, polyvinyl pyrrolidone, sodium polyacrylate, polymethyl vinyl ether, casein and polyacrylamide.

The binder or the thickener is preferably used at a ratio of 1–50 wt.% especially 0.5–30 wt.% based on the powder.

In this case, if necessary, it is possible to add a desired surfactant such as long chain hydrocarbons and fluorinated hydrocarbons or graphite or the other fillers thereby easily bonding the particles on the membrane.

In the bonding of the particles or the particle groups for the porous layer on the ion exchange membrane is carried out by thoroughly mixing the conductive or non-conductive particles, if necessary, a binder or a thickener in a desired medium such as an alcohol or a hydrocarbon to prepare a paste of the mixture and coating the paste on the membrane by a screen printing etc.

In the present invention, the particles or the particle groups can be adhered on the membrane by preparing a syrup or slurry of the mixture instead of the paste of the mixture of the particles and spraying it on the membrane.

In the present invention, the process and method of formation of the porous layer on the membrane in a thin pattern are not critical and can be various processes such as a screen printing process, a spraying process and also a transcription-printing process and a roll coating process. In the screen printing process, the paste is printed through a screen having a desired pattern which is previously prepared. In the roll printing process it is printed by a roll having a desired pattern which is previously engraved.

The particles or particle groups for the porous layer adhered on the ion exchange membrane are preferably heat press-bonded at 80°–220° C. by a press or a roll under a pressure of 1–150 kg/cm² or under a pressure of 1–100 kg/cm² respectively. The particles or particle groups are preferably partially embedded into the membrane.

The porous layer made of the particles or particle groups bonded on the membrane preferably has a porosity of 30–99%, especially 40–95% and a thickness of 0.01–100μ preferably 0.1–50μ, especially 0.5–20μ, which is less than that of the membrane.

Figure 3:
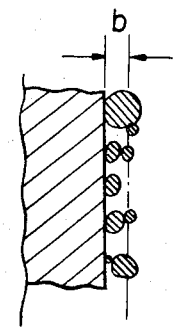
FIGS. 3(i)–3(ii) are sectional views for illustrating a calculation of a thickness of a porous layer made of particles or particle groups.
Figure 3I:
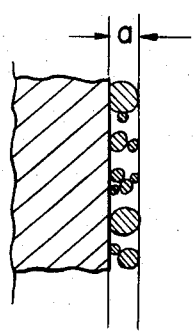

The thickness of the porous layer made of the particles or particle groups is given by the size (a) in the case of the uniform size of the particles or particle groups as shown in FIG. 3(i) and is given by an average size (b) in the case of non-uniform sizes of the particles or particle groups as shown in FIG. 3(ii).

The porosity of the porous layer is given by a calculation of the aforementioned thickness of the porous layer.

In the present invention, the ion exchange membrane having the porous layer on the membrane is preferably a membrane having cation exchange groups such as carboxylic acid groups, sulfonic acid groups, phosphoric acid groups or phenolic hydroxy groups preferably a membrane made of a fluorinated polymer especially a copolymer of a vinyl monomer such as tetrafluoroethylene or chlorotrifluoroethylene and a fluorovinyl monomer having an ion exchange group such as sulfonic acid group, carboxylic acid group or phosphoric acid group.

It is especially preferable to use a polymer having the following units (M) and (N).

wherein X represents, F, Cl, H or —CF₃; X' represents X or $CF_3(CF_2)_{\overline{m}}$ and m represent an integer of 1 to 5 and Y represents

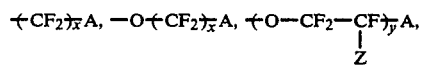

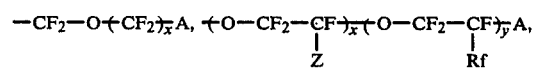

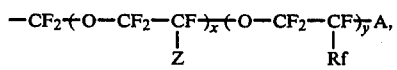

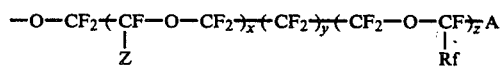

and x, y and z respectively represent 0 to 10; z and Rf respectively represent —F or a $C_{1-10}$ perfluoroalkyl group and A represents —SO₃M —COOM or —SO₂F, —CN, —COF or —COOR which can be converted into —SO₃M or —COOM; M represents hydrogen or alkali metal atom; and R represents a $C_{1-10}$ alkyl group.

It is preferable to use a cation exchange membrane having an ion exchange group content of 0.5 to 4.0 meq/g.dry polymer especially 0.8 to 2.0 meq/g.dry polymer. In order to give such ion exchange group content in the case of the ion exchange membrane made of the copolymer having the units (M) and (N), the ratio of the units (N) is preferably in a range of 1 to 40 mol % especially 3 to 25 mol.%.

The cation exchange membrane used in the present invention is not limited to be made of only one kind of the polymer or the polymer having only one kind of the ion exchange group. It is possible to use a laminated membrane made of two kinds of polymers having smaller ion exchange group content in the cathode side or an ion exchange membrane having weak acidic exchange groups such as carboxylic acid groups in the cathode side and strong acidic exchange groups such as sulfonic acid groups in the anode side.

The ion exchange membrane can be prepared by the conventional process and can be reinforced with a fabric such as a woven fabric and a net; a nonwoven fabric a metallic mesh or a porous substrate.

A thickness of the ion exchange membrane is preferably in a range of 50 to 1000$\mu$ preferably 100 to 500$\mu$.

When the porous layer is formed on the ion exchange membrane in the anode side or the cathode side or both sides, the bonding can be carried out in a desired form of the ion exchange groups for preventing the decomposition of the ion exchange groups for example, an acid form or an ester form in the case of carboxylic acid groups and a $-SO_2F$ form in the case of sulfonic acid groups.

Various kinds of the electrodes can be used together with the membrane of the present invention. For example, foraminous electrodes such as a porous plate, a net, a punched metal or an expanded metal can be used. As the typical foraminous electrode, an expanded metal having a major length of 1.0–10 mm; a minor length of 0.5–10 mm; a mesh width of 0.1–1.3 mm and a ratio of opening area of 30–90% is used. Plural plate-like electrodes can be also used. It is preferable to use plural electrodes having different ratio of opening area to place the electrode having a smaller ratio of opening area in the side of the membrane.

The anode is usually made of a platinum group metal, a conductive platinum group metal oxide or reduced-oxide.

The cathode is usually made of a platinum group metal, a conductive platinum group oxide or iron group metal. The platinum group metal can be Pt, Rh, Ru, Pd and Ir. The iron group metal can be Fe, Co, Ni, Raney nickel, a stabilized Raney nickel, stainless steel, an alkali etching stainless stell (U.S. Pat. No. 4,255,247), Raney nickel plated cathode (U.S. Pat. Nos. 4,170,536 and 4,116,804), a nickel rhodanate plated cathode (U.S. Pat. Nos. 4,190,514 and 4,190,516).

When an electrode having openings is used, the electrode can be prepared by using the material for the anode or the cathode itself. When the platinum group metal or the conductive platinum group metal oxide is used the material is preferably coated on the surface of an expanded metal made of a valve metal such as titanium and tantalum.

When the electrode is assembled in the present invention, the electrode is preferably placed in contact with an ion exchange membrane. It can be placed to depart from the ion exchange membrane with a desired gap, although the reduction of the cell voltage is not remarkable. When the electrode is placed in contact with the porous layer on the ion exchange membrane, it is preferable to contact it under a low pressure such as 0–2.0 kg/cm rather than high pressure.

When the porous layer is formed only one surface of the ion exchange membrane in the anode side or the cathode side, the electrode placed in the side of the ion exchange membrane on which a porous layer is not formed, can be placed with or without contacting with the surface of the ion exchange membrane.

The electrolytic cell used in the present invention can be a monopolar or bipolar type in the aforementioned structure. The material for the cell used in the electrolysis of an aqueous solution of an alkali metal chloride is made of a material being resistant to an aqueous solution of an alkali metal chloride and chlorine in the anode compartment such as valve metals and titanium and being resistant to an alkali metal hydroxide and hydrogen in the cathode compartment such as iron, stainless steel and nickel.

The condition of the process for electrolysis of an alkali metal chloride can be the known condition disclosed in the prior art Japanese Unexamined Patent Publication No. 112398/1979.

An aqueous solution of an alkali metal chloride having a concentration of 2.5–5.0 normal (N) is preferably fed into the anode compartment and water or a dilute solution of an alkali metal hydroxide is fed into the cathode compartment and an electrolysis is preferably performed at 80° C.–120° C. and at a current density of 10–100 A/dm$^2$. In the electrolysis, it is preferable to minimize heavy metal ions such as calcium ions and magnesium ions because such ions cause deterioration of the ion exchange membrane. In order to prevent possibly the formation of oxygen in the anode, it is possible to add an acid such as hydrochloric acid in the aqueous solution of an alkali metal chloride.

The use of the membrane has been mainly illustrated in the case of the electrolysis of an aqueous solution of an alkali metal chloride. The membrane can be, of course, used in an electrolysis of water, a hydrogen halide acid (HCl, HBr), or an alkali metal carbonate.

The present invention will be further illustrated by certain examples and references which are provided for purpose of illustration only and are not intended to limit the present invention.

EXAMPLE 1

A mixture of 10 wt.parts of rutile type titanium oxide powder having a particle diameter of 10–20$\mu$ obtained by sieving a commercial product (particle diameter of less than 25$\mu$), 1 wt.part of a modified PTFE powder of polytetrafluoroethylene coated with a copolymer of $CF_2=CF_2$ and $CF_2=CFO(CF_2)_3COOCH_3$ (particle diameter of 0.5$\mu$ or less), 0.3 wt.part of methyl cellulose (2% aqueous solution: viscosity of 1500 cps), 14 wt.parts of water, 0.2 wt.part of cyclohexanol and 0.1 wt.part of cyclohexanone was kneaded to obtain a paste.

The paste was printed by a screen printing on a surface of a cation exchange membrane made of a copolymer of $CF_2=CF_2$ and $CF_2=CFO(CF_2)_3COOCH_3$ (ion exchange capacity of 1.44 meq/g.dry polymer; thickness of 280$\mu$) as a printing substrate in the anode side with a screen made of polyethyleneterephthalate (mesh of 200; thickness of 75$\mu$) a printing plate having a screen mask (thickness of 30$\mu$) and a polyurethane squeezer. The coated layer on the membrane was dried.

On the other hand, the same rutile type titanium oxide powder was coated, in the side of the cathode, on the surface of the membrane having the porous layer in the anode side by the same manner. Both particle layers were press-bonded on the surfaces of the ion exchange membrane at 140° C. under a pressure of 30 kg/cm². The ion exchange membrane was hydrolyzed by dipping into 25 wt.% aqueous solution of an alkali metal hydroxide at 90° C. for 16 hours.

On each surface of the ion exchange membrane, the titanium oxide particles were bonded at a content of 0.7 mg/cm².

According to microscopic observation of the porous layer on the membrane, the titanium oxide particles or particle groups are separately bonded on the membrane in a height of the particles of about $20\mu$ from the level of the membrane.

EXAMPLES 2 TO 9

In accordance with the process of Example 1 except varying the composition of the paste by using each kind of particles having each particle diameter at each content shown in Table 1 and using no modified PTFE in Examples 2, 4, 6 and 9, each cation exchange membrane having porous layers on both surfaces was prepared.

The particles were prepared, if necessary, by crushing commercial products and sieving to classify particles in the ranges shown in Table 1.

According to the microscopic observation of the porous layers formed on the membrane, the particles or particle groups were separately bonded on the membrane.

In the paste compositions used in Examples 2, 4 and 8, the binder of the modified PTFE was not used for both layers.

TABLE 1

| Example No. | Particles in anode side (particle diameter) Content | Particles in cathode side (particle diameter) Content |
| --- | --- | --- |
| 2 | $TiO_2$ (10–20$\mu$) 0.8 mg/cm² | NiO (15–30$\mu$) 0.7 mg/cm² |
| 3 | $TiO_2$ (10–20$\mu$) 0.9 mg/cm² | Graphite fiber (length 120$\mu$) (diameter 10$\mu$) 0.5 mg/cm² |
| 4 | $Ta_2O_5$ (10–20$\mu$) 1.0 mg/cm² | Ni (10–20$\mu$) 0.6 mg/cm² |
| 5 | $SnO_2$ (10–20$\mu$) 0.7 mg/cm² | $Ta_2O_5$ (15–25$\mu$) 0.4 mg/cm² |
| 6 | $Fe_2O_3$ (2–5$\mu$) 0.1 mg/cm² | $Nb_2O_5$ (1–2$\mu$) 0.08 mg/cm² |
| 7 | $Fe_2O_3$ (2–5$\mu$) 0.09 mg/cm² | Active carbon (10–25$\mu$) 0.3 mg/cm² |
| 8 | $Fe_2O_3$ (2–3$\mu$) 0.07 mg/cm² | $ErO_2$ (2–5$\mu$) 0.06 mg/cm² |
| 9 | $Nb_2O_5$ (2–5$\mu$) 0.06 mg/cm² | ETFE*resin (15–25$\mu$) 0.1 mg/cm² |

*ETFE represents a copolymer of tetrafluoroethylene and ethylene.

EXAMPLE 10

A suspension of 10 g. of titanium oxide powder having a particle diameter of 2–5$\mu$ and 1 g. of a modified PTFE powder of polytetrafluoroethylene having a particle diameter of 1$\mu$ or less coated with a copolymer of $CF_2=CF_2$ and $CF_2=CFO(CF_2)_3COOCH_3$ in 100 ml. of water was sprayed by a spray gun on both surfaces of an ion exchange membrane made of a copolymer of $CF_2=CF_2$ and $CF_2=CFO(CF_2)_3COOCH_3$ having an ion exchange capacity of 1.43 meq/g.dry polymer and a thickness of 280$\mu$ which was placed on a hot plate at 140° C. The spraying rate was controlled so as to dry up water in the sprayed suspension for 15 sec. or shorter. The porous layers formed by the spraying were press-bonded on the ion exchange membrane at 140° C. under a pressure of 30 kg/cm². The ion exchange membrane was hydrolyzed by dipping into 25 wt.% aqueous solution of an alkali metal hydroxide at 90° C.

On each surface of the ion exchange membrane, the titanium oxide particles were bonded at a content of 0.2 mg/cm².

EXAMPLE 11

In accordance with the process of Example 1 except using a cation exchange membrane made of a copolymer of $CF_2=CF_2$ and $CF_2=CFOCF_2CF(CF_3)OCF_2CF_2SO_2F$ (ion exchange capacity of 0.87 meq/g. dry polymer: thickness of 300$\mu$), an ion exchange membrane having each layer of titanium oxide particles having a particle diameter of 10–20$\mu$ at a content of 1.0 mg/cm² on both surfaces in the anode side and the cathode side was obtained.

The characteristics of electrolysis in the case of the use of the ion exchange membrane of the present invention will be illustrated by certain examples.

Test No. 1:

An anode having low chlorine overvoltage which was made of a titanium expanded metal (minor length of 2.5 mm; major length of 5 mm) coated with a solid solution of ruthenium oxide, iridium oxide and titanium oxide was placed in the anode side and a cathode having low hydrogen overvoltage which was made of a SUS 304 expanded metal (minor length of 2.5 mm; major length of 5 mm) etched in 52 wt.% of aqueous solution of NaOH at 150° C. for 152 hours was placed in the cathode side of contact them with each ion exchange membrane under a pressure to form a cell. 5N-aqueous solution of NaCl was fed into an anode compartment and water was fed into a cathode compartment to perform an electrolysis under the condition maintaining concentrations to 4N—NaCl in the anode compartment and 35 wt.% of NaOH in the cathode compartment at 90° C. and a current density of 40 A/dm². The results are shown in Table 2.

The kinds of the ion exchange membranes having the porous layers are shown by the references of the examples.

TABLE 2

| No. | Ion exchange membrane (Example No.) | Cell voltage (V) | Current efficiency (%) |
| --- | --- | --- | --- |
| 1 | 1 | 3.21 | 92.0 |
| 2 | 2 | 3.24 | 92.5 |
| 3 | 3 | 3.22 | 91.5 |
| 4 | 4 | 3.26 | 93.0 |
| 5 | 5 | 3.20 | 92.5 |
| 6 | 6 | 3.27 | 93.0 |
| 7 | 7 | 3.29 | 93.5 |
| 8 | 8 | 3.28 | 92.0 |
| 9 | 9 | 3.35 | 91.5 |
| 10 | 10 | 3.29 | 92.0 |
| 11 | 11 | 3.28 | 85.0 |

Test No. 2:

In accordance with the process of Test No. 1 except placing the anode and the cathode departed from each ion exchange membrane with each gap of 1.0 mm, each electrolysis was carried out. The results are shown in Table 3.

TABLE 3

| No. | Ion exchange membrane (Example No.) | Cell voltage (V) | Current efficiency (%) |
| --- | --- | --- | --- |
| 12 | 1 | 3.26 | 93.5 |
| 13 | 3 | 3.28 | 92.5 |
| 14 | 5 | 3.26 | 93.0 |
| 15 | 7 | 3.36 | 94.0 |
| 16 | 9 | 3.40 | 92.5 |

Test No. 3:

Test electrodes used in Test No. 1 were used to contact them with each ion exchange membrane having porous layers under a pressure to form each cell.

3.5N aqueous solution KCl was fed into the anode compartment and water was fed into the cathode compartment and an electrolysis was carried out under the condition maintaining concentration to 2.5N-KCl in the anode compartment and 35 wt.% of KOH in the cathode compartment at 90° C. and a current density of 40 A/dm$^2$. The results are shown in Table 4.

TABLE 4

| No. | Ion exchange membrane (Example No.) | Cell voltage (V) | Current efficiency (%) |
| --- | --- | --- | --- |
| 17 | 2 | 3.17 | 95.0 |
| 18 | 4 | 3.21 | 96.0 |
| 19 | 6 | 3.23 | 95.5 |

Test No. 4:

An anode made of a nickel expanded metal (minor length of 2.5 mm; major length of 5 mm) was placed in the anode side and a cathode having low hydrogen overvoltage which is made of a SUS 304 expanded metal (minor length of 2.5 mm; major length of 5 mm) etched in 52% NaOH at 150° C. for 52 hours was placed in the cathode side to contact them with each ion exchange membrane under a pressure.

30% Aqueous solution of KOH was fed into an anode compartment and water was fed into a cathode compartment and an electrolysis was carried out under the condition maintaining concentrations of KOH in the anode compartment and the cathode compartment to 20% at 90° C. and a current density of 50 A/dm$^2$. The results are shown in Table 5.

TABLE 5

| No. | Ion exchange membrane (Example No.) | Cell voltage (V) |
| --- | --- | --- |
| 20 | 4 | 2.11 |
| 21 | 5 | 2.23 |

REFERENCE

In accordance with the process of Test No. 1 except using the ion exchange membrane having no porous layer used in Example 1, an electrolysis was carried out under the same condition. The results are as follows.

Cell voltage (V): 3.61
Current efficiency (%): 93.5

EXAMPLE 12

A mixture of 10 wt.parts of rutile type titanium oxide powder having a particle diameter of 10–20μ obtained by sieving a commercial product (particle diameter of 25μ or less), 0.3 wt.% of methyl cellulose (2% aqueous solution; viscosity of 1500 cps); 14 wt.parts of water, 0.2 wt.part of cyclohexanol and 0.1 wt.part of cyclohexanone was kneaded to obtain a paste.

The paste was printed by a screen printing on a surface of a cation exchange membrane made of a copolymer of $CF_2=CF_2$ and $CF_2=CFO(CF_2)_3COOCH_3$ (ion exchange capacity of 1.44 meq/g.dry polymer; thickness of 280μ) as a printed substrate in anode side with a screen made of polyethyleneterephthalate (mesh of 200; thickness of 75μ) a printing plate having a screen mask (thickness of 30μ) and a polyurethane squeezer to give a pattern shown in FIG. 4.

In the pattern, each square having a side of 1 mm was arranged with a gap to the adjacent square and a ratio of the coated area was 70%. The coated membrane was dried.

On the other hand, tin dioxide particles having the same particle diameter were also coated by the same manner on the surface in the cathode side and both particle layers were press-bonded to the ion exchange membrane at 140° C. under a pressure of 30 kg/cm$^2$. The ion exchange membrane was hydrolyzed by dipping it into 25 wt.% NaOH at 90° C. for 16 hours.

On the surfaces of the ion exchange membrane, an amount of titanium oxide particles was 0.5 mg/cm$^2$ and a content of tin dioxide particles was 0.4 mg/cm$^2$.

EXAMPLES 13–15

In accordance with the process of Example 12 except varying the composition of the paste by using each kind of particles having each particle diameter at each content shown in Table 6, each cation exchange membrane having porous layers on both surfaces was prepared.

The particles were prepared, if necessary, by crushing commercial products and sieving to classify particles in the range shown in Table 6.

TABLE 6

| Example No. | Anode side: Particles (particle diameter) Amount Pattern Coated rate | Cathode side: Particles (particle diameter) Amount Pattern Coated rate |
| --- | --- | --- |
| 13 | SnO$_2$ (10–20μ) 1.0 mg/cm$^2$ whole surface 100% | ZrO$_2$ (2–5μ) 0.5 mg/cm$^2$ 1 mmφ polka dots 39% (FIG. 5) |
| 14 | ZrO$_2$ (2–5μ) 1.0 mg/cm$^2$ whole surface 100% | Graphite (1–2μ) 0.2 mg/cm$^2$ 0.5 mmφ polka dots 50% (FIG. 5) |
| 15 | TiO$_2$ (10–20μ) 1.0 mg/cm$^2$ whole surface 100% | NiO (15–30μ) 0.4 mg/cm$^2$ lattice: side of 1 mm 50% (FIG. 4) |

Test No. 5:

In accordance with the process of Test No. 1, each electrolysis using the membrane of Example 12, 13, 14 or 15 was carried out. The results are shown in Table 7.

TABLE 7

| No. | Ion exchange membrane (Example No.) | Cell voltage (V) | Current efficiency (%) |
| --- | --- | --- | --- |
| 22 | 12 | 3.27 | 93.0 |
| 23 | 13 | 3.25 | 93.5 |
| 24 | 14 | 3.22 | 92.5 |
| 25 | 15 | 3.25 | 93.0 |

We claim:

1. A cation exchange membrane for electrolysis which comprises a gas and liquid permeable porous non-electrode layer on at least one surface of said membrane wherein said porous layer is formed by many conductive or non-conductive particles or particle groups which are partially or wholly discontinuously bonded on said membrane.

2. The cation exchange membrane according to claim 1 wherein said particles and particle groups are discontinuously bonded in a continuous pattern on said membrane.

3. The cation exchange membrane according to claim 1 or 2 wherein said particles or particle groups are bonded at a rate of 0.001 to 5 mg/cm$^2$ on said membrane.

4. The cation exchange membrane according to claim 1 or 2 wherein said conductive or non-conductive particles are made of an inorganic or organic material having corrosion resistance to an electrolyte and an evolved gas at an electrode.

5. The cation exchange membrane according to claim 1, 2, 3 or 4 wherein said particles or particle groups are bonded in the presence of a binder made of a fluorinated polymer on said membrane.

6. The cation exchange membrane according to claim 1, 2 or 3 wherein said conductive or non-conductive particles are made of a metal in IV-A Group, IV-B Group, V-B Group, ion Group or chromium, manganese or boron or an alloy, an oxide, a hydroxide, a nitride or a carbide of said metal.

7. The cation exchange membrane according to claim 1, 2, 3, 4 or 5 wherein said membrane has cation exchange groups selected from the group consisting of sulfonic acid groups, carboxylic acid groups and phosphoric acid groups.

8. An ion exchange membrane cell which comprises an anode compartment and a cathode compartment formed by partitioning by an ion exchange membrane which has a gas and liquid permeable porous non-electrode layer formed by many conductive and non-conductive particles or particle groups which are discontinuously bonded on at least one surface of said membrane.

9. The ion exchange membrane cell according to claim 8 wherein said particles or particle groups are discontinuously bonded in a continuous pattern on said membrane.

10. The ion exchange membrane cell according to claim 8 or 9 wherein said particles or particle groups are bonded at a rate of 0.001 to 5 mg/cm$^2$ on said membrane.

11. The ion exchange membrane cell according to claim 8, 9 or 10 wherein said conductive or non-conductive particles are made of an inorganic or organic material having corrosion resistance to an electrolyte.

12. The ion exchange membrane cell according to claim 8, 9, 10, 11 or 12 wherein said membrane has cation exchange groups selected from the group consisting of sulfonic acid groups, carboxylic acid groups and phosphoric acid groups.

13. The ion exchange membrane cell according to claim 8, 9, 10, 11, 12 or 13 wherein at least one electrode is brought into contact with said ion exchange membrane.

14. The ion exchange membrane cell according to claim 8 or 13 wherein said electrode is an expanded metal having a major length of 1.0–10 mm and a minor length of 0.5–10 mm and a ratio of opening area of 30–90%.

15. The ion exchange membrane cell according to claim 8, 13 or 14 wherein plural foraminous electrodes having different ratio of opening area are used and an electrode having smaller ratio of opening area is placed near said membrane.

16. The ion exchange membrane cell according to claim 8, 9, 10, 11, 12, 12, 13 or 14 which is suitable for electrolysis of water, an acid, a base, an alkali metal halide or an alkali metal carbonate.

* * * * *